Jan. 1, 1957

C. J. COQUYT 2,775,974

EGG WASHING MACHINE

Filed March 29, 1956

INVENTOR.
CAMIEL J. COQUYT
BY
*Paul, Moore & Ruggee*

ATTORNEYS

United States Patent Office 2,775,974
Patented Jan. 1, 1957

2,775,974

EGG WASHING MACHINE

Camiel J. Coquyt, Ghent, Minn.

Application March 29, 1956, Serial No. 574,808

8 Claims. (Cl. 134—139)

This invention relates to an improved machine for washing eggs. More particularly this invention relates to a machine for washing eggs wherein the eggs are placed in an open mesh basket and mounted on a platform which is freely rotatable in a tank of warmed water, the basket being rotated by induced water currents within the tank.

Figure 1:
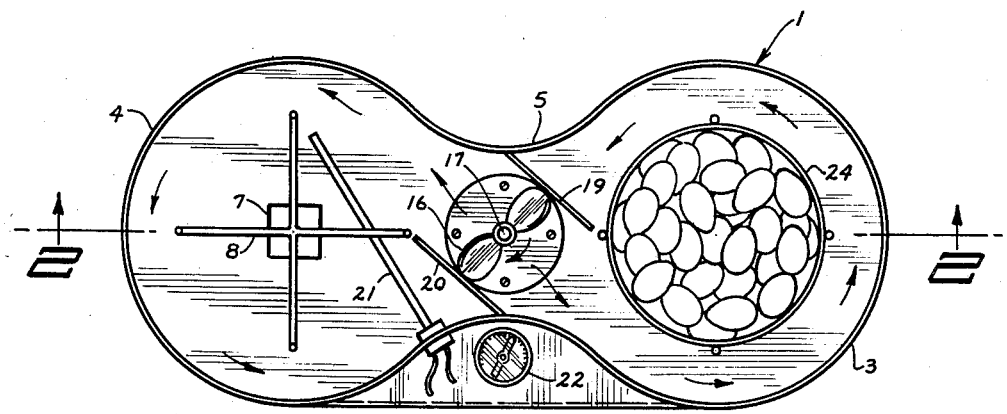
Figure 2:
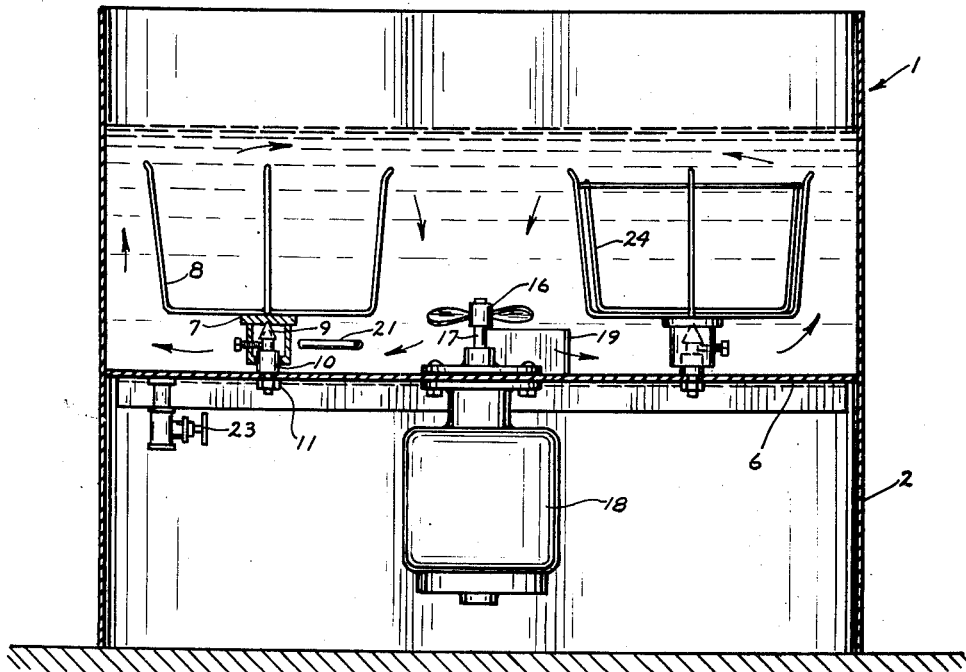
Figure 3:
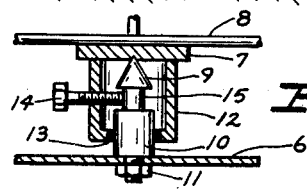

The invention is illustrated by the drawings wherein the same numerals refer to corresponding parts and in which Figure 1 is a plan view of the egg washer tank and associated parts;

Figure 2 is a vertical section through the egg washer taken on line 2—2 of Figure 1 and in the direction of the arrows; and Figure 3 is an enlarged detail vertical sectional view of the pivot support for the egg basket supporting means.

Referring to the drawings, there is provided a sheet metal tank 1 mounted on a sheet metal enclosing standard or base 2. The tank 1 comprises two generally cylindrical portions 3 and 4 which are connected by a norrower constricted throat 5. The tank has a bottom 6.

Centrally within each of the cylindrical portions 3 and 4 there is mounted a basket supporting rack having a square base 7 and four outwardly and upwardly projecting arms 8. The base 7 is mounted on a spear head pivot having a conical point 9 of hardened nickel chrome steel and a vertical threaded stem or shaft 10 projecting through the bottom 6 of the tank and secured in position by a bolt 11. Suitable washers or gaskets are provided to prevent leakage. To provide stability for the basket supporting rack base 7 is welded or otherwise suitably secured to a tubular sleeve 12 partially enclosing the pivot point 9 and its shaft 10. A carbon bearing ring 13 is pressed into the opposite end of sleeve 12 to journal shaft 10. The rack is retained against disengagement with the pivot by means of a thumb set screw 14 the inner end of which extends into an annular channel 15 at the base of the conical pivot point 9.

An impeller 16 is positioned midway between the cylindrical portions 3 and 4 of the tank in the constricted portion 5. The impeller is fixed to the vertical shaft 17 of an electric motor 18 mounted under the bottom 6 of the tank. Shaft 17 is provided with suitable bearings to maintain a leak-proof relation to the tank. The blades of impeller 16 are spaced apart from the bottom of the tank and are pitched to thrust the water in the tank downwardly and outwardly, that is, with the leading edges of the blades higher than the trailing edges as the blades rotate. The impeller blades rotate horizontally in approximately the plane of the bottoms of the basket holding racks.

A pair of perpendicular baffles 19 and 20 is positioned in the bottom of the constricted portion 5 of the tank to direct and guide the flow of water induced by impeller 16. The baffles are positioned parallel to one another and at about a 45 degree angle to the longitudinal center line of the washer. The baffles are generally tangential to the circle described by the tips of the blades of the impeller but are of a height slightly lower than the impeller blades. The baffles extend approximately inwardly from the outer wall of the tank and the transverse center line of the washer to about the longitudinal center line of the washer.

The water within the tank may be heated by any common form of heating element. A typical tubular electric heating unit 21 is shown mounted on one side wall of the tank 1. Heating unit 21 is thermostatically controlled and is connected to any suitable source of electric energy, as is the motor 18.

An electrically or mechanically operated clock timing unit 22 is mounted on a shelf adjacent the narrow constricted portion of the tank. Its purpose is to advise the attendant of the passage of time so far as concerns a particular batch of eggs. The clock preferably has an alarm to alert the attendant. A suitable drain cock 23 is provided to empty the tank of water as necessary to replenish the wash water.

The eggs to be washed are placed in an open basket 24 preferably made of rubber or rubber-coated wire adapted to fit within the upstanding arms 8 of the basket holding rack. The tank 1 has previously been filled with water to a depth sufficient to submerge the eggs and preferably a mild detergent has been added. The water is warmed slightly. The impeller 16 is turned on and the rotation of the impeller blades draws the water downwardly and thrusts it outwardly against baffles 19 and 20.

The currents induced by the impeller and guided by the baffles flow generally with a counter-clockwise motion in an upward spiral in both of the cylindrical portions 3 and 4 of the tank and at the same time rotate the eggs in their baskets in the supporting racks on the pivotal mounts. The eggs are partially buoyed up by the water and when the baskets are rotated the individual eggs tend to move with respect to one another to assist in the cleaning action. Normally the eggs are suitably cleaned after about ten minutes rotating in the tank, whereupon the cleaned eggs are removed and two baskets of soiled eggs are substituted therefor.

It will be noted that the egg baskets are rotated solely by the currents induced by the impeller 16. This provides a gentle action which effectively cleanses the shells of eggs without subjecting them to damage such as cracking and breaking.

While the basket holding rack is shown with four upstanding arms for convenience, it is obvious that any number of arms greater than three may be used or the rack may be replaced by any openwork cylinder or drum adapted to receive an egg basket.

It is apparent that many modifications and variations of this invention as hereinbefore set forth may be made without departing from the spirit and scope thereof. The specific embodiments described are given by way of example only and the invention is limited only by the terms of the appended claims.

What I claim as my invention is:

1. An egg washing machine comprising a tank adapted to contain water, said tank including two generally cylindrical portions interconnected by a narrower constricted throat, an openwork egg basket supporting means pivotally mounted centrally within each of said cylindrical portions, a current inducing impeller positioned within said constricted throat and baffles positioned adjacent to said impeller to direct current flows into said cylindrical portions.

2. An egg washing machine according to claim 1 further characterized in that the means for pivotally mounting the egg basket supporting means comprises a vertical shaft having a conical hardened steel pivot point and a tubular sleeve secured to the bottom of said supporting means and extending down over said shaft.

3. An egg washing machine according to claim 2 further characterized in that said tubular sleeve is provided with a bearing ring at its lower end away from the basket supporting means and said vertical shaft is journalled in said bearing ring.

4. An egg washing machine according to claim 2 further characterized in that said vertical shaft is provided with an annular channel and said tubular sleeve is provided with a thumb screw for engagement with said channel to retain the basket supporting means on the pivot.

5. An egg washing machine according to claim 1 further characterized in that the impeller is mounted on a vertical shaft and spaced apart from the bottom of the tank to rotate horizontally in about the same plane as the bottoms of the basket supporting means and said baffles extend generally perpendicularly upward from the bottom of the tank to just short of the plane of rotation of the impeller.

6. An egg washing machine according to claim 5 further characterized in that said baffles are parallel and disposed at about a 45° angle from the longitudinal center line of the tank.

7. An egg washing machine according to claim 6 further characterized in that said baffles extend from the outer wall of the tank at about the transverse center line of the tank angularly inward to about the longitudinal center line of the tank.

8. An egg washing machine comprising a tank adapted to contain water, said tank including two generally cylindrical portions interconnected by a narrower constricted throat, an open work egg basket supporting means pivotally mounted centrally within each of said cylindrical portions and adapted to receive and hold an egg basket, the means for pivotally mounting said supporting means including a vertical shaft secured to the bottom of the tank and having a conical hardened steel pivot point and an intermediate annular channel, and a tubular sleeve secured to the bottom of said supporting means and extending down over said shaft, said tubular sleeve being provided with a bearing ring at its lower end away from the basket supporting means and said vertical shaft being journalled in said bearing ring, said tubular sleeve being further provided with a thumb screw for engagement with said annular channel to retain the basket supporting means on the pivot, a current inducing impeller positioned centrally within said constricted throat and mounted on a vertical shaft and spaced apart from the bottom of the tank to rotate horizontally in about the same plane as the bottoms of the basket supporting means, a pair of parallel perpendicular baffles extending upwardly from the bottom of the tank to just short of the plane of rotation of the impeller, said baffles being disposed at about a 45° angle from the longitudinal center line of the tank and extending from the outer wall of the tank at about the transverse center line of the tank angularly inward to about the longitudinal center line of the tank, whereby current flows induced by said impeller are directed to rotate said pivotally mounted basket supporting means.

No references cited.